United States Patent
Yoo

(10) Patent No.: US 7,062,600 B2
(45) Date of Patent: Jun. 13, 2006

(54) APPARATUS AND METHOD OF CONTROLLING INFORMATION PROCESS SYSTEM OF MOBILE TERMINAL APPARATUS USING FLASH MEMORY

(75) Inventor: Young-jae Yoo, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 10/385,463

(22) Filed: Mar. 12, 2003

(65) Prior Publication Data

US 2003/0182496 A1  Sep. 25, 2003

(30) Foreign Application Priority Data

Mar. 19, 2002  (KR) ............................... 2002-14850

(51) Int. Cl.
*G06F 12/00* (2006.01)

(52) U.S. Cl. ............................ 711/103; 711/105; 713/1

(58) Field of Classification Search ........... 365/185.33, 365/189.05, 222; 711/100, 103, 154, 105; 455/550.1, 572, 566, 550.01; 713/1

See application file for complete search history.

(56) References Cited

U.S. PATENT DOCUMENTS 5,396,637 A * 3/1995 Harwell et al. ............. 365/228

FOREIGN PATENT DOCUMENTS

| CN | 1152142 A |   | 6/1997 |
|----|-----------|---|--------|
| JP | 07028572 A | * | 1/1995 |
| JP | 2002268955 A | * | 9/2002 |
| JP | 2004056563 A | * | 2/2004 |

* cited by examiner

*Primary Examiner*—Tuan V. Thai
(74) *Attorney, Agent, or Firm*—Staas & Halsey LLP

(57) ABSTRACT

An apparatus and a method of controlling an information process system of a mobile apparatus using a flash memory. The information process system controlling the mobile apparatus has a main memory storing a user-set data and a flash memory storing a backup data of the user-set data stored in the main memory when a main power is turned off and/or when a backup command is input by a user. A programmed CPU controls the information process system by determining whether the main power is turned off and/or whether the backup command is input by the user, and backs up the main-memory user-set data to the flash memory. Accordingly, since the user-set data is backed-up to the flash memory when the main power is turned off, an initialization image and an initialization menu can be executed according to the user-set data when the mobile apparatus is re-operated.

2 Claims, 3 Drawing Sheets

APPARATUS AND METHOD OF CONTROLLING INFORMATION PROCESS SYSTEM OF MOBILE TERMINAL APPARATUS USING FLASH MEMORY

CROSS-REFERENCE TO RELATED APPLICATIONS

This application claims the benefit of Korean Patent Application No. 2002-14850 filed on Mar. 19, 2002, in the Korean Intellectual Property Office, the disclosure of which is incorporated herein by reference.

BACKGROUND OF THE INVENTION

1. Field of the Invention

The present invention relates to a mobile terminal apparatus or a terminal device used complexly with the mobile terminal apparatus, and more particularly, to an apparatus and method of controlling an information process system of a mobile terminal apparatus using a flash memory, which is capable of protecting a user-set data by using the flash memory.

2. Description of the Related Art

Mobile terminal apparatuses, such as a cellular phone, a personal digital assistant (PDA), a hand-held PC (HPC), etc., have been popularized by their capability to store information, function like a computer, and transmit data, including an audio signal, through a communication channel, and their portability.

FIG. 3 is a block diagram of an apparatus controlling an information process system of the above-described mobile terminal apparatus. As shown in FIG. 3, the apparatus controlling the information process system includes a backup battery 400, a CPU 100, a flash memory 500 and a main memory 300. The information process system of the mobile terminal apparatus further comprises a main battery, a battery switching portion, and a display portion (not shown).

The CPU 100 controls the information process system of the mobile terminal apparatus. Typically, the main memory 300 is a dynamic RAM (DRAM), and stores data that is set by a user during the operation of the mobile terminal apparatus and stores running programs. The data stored in the DRAM is deleted when power is turned off. The flash memory 500 is a non-volatile memory comprising a flash read only memory (ROM) and an electrically erasable and programmable ROM (EEPROM). The data stored in the flash memory 500 is still retained when the power is turned off. The flash memory 500 holds/stores boot data that is used in booting the information process system of the terminal apparatus, and stores boot application program data. For example, the flash memory 500 retains the boot data, etc., therein after the data has been copied to another memory, such as the main memory 300, for execution.

The main battery (not shown) provides main power for operating the mobile terminal apparatus. The backup battery 400 provides auxiliary power to the main memory 300 of the mobile terminal apparatus when the main power is turned off. The battery switching portion (not shown) is switched to supply the main power from the main battery to the mobile terminal apparatus including the main memory 300 or to supply the auxiliary power from the backup battery 400 to the mobile terminal apparatus including the main memory 300.

When the power supplied to the information process system of the mobile terminal apparatus is lowered to (below) a predetermined level, the CPU 100 controls the battery switching portion to supply the auxiliary power from the backup battery 400 to the main memory 300.

The operation of the information process system of the mobile terminal apparatus as described above will be described in detail hereinbelow. The CPU 100 stores data that is externally transmitted or data that is input by a user in the main memory 300. The user-set data stored in the main memory 300, which is the DRAM, is deleted either when the power is turned off or when the power is lowered to a predetermined level. The power-off can occur due to a lowered power of the main battery and/or a sudden separation of the main battery from the mobile terminal apparatus.

To prevent the data stored in the main memory 300 from being deleted, the CPU 100 determines that the power of the main battery is lowered to the predetermined level during use of the mobile terminal apparatus, and then switching the mobile terminal apparatus to an unusable mode, for example, by blocking a communication with the external environment by disconnecting and/or staying disconnected. Then, the CPU 100 transmits a control signal to the battery switching portion to supply the auxiliary power from the backup battery 400 to the main memory 300. According to the above operation, the data stored in the main memory 300 is retained.

When the main battery is newly charged or replaced with a new battery, the CPU 100 controls the battery switching portion to supply the power to the mobile terminal apparatus from the main battery. By supplying power from the main battery, the CPU 100 initializes the mobile terminal apparatus to return the mobile terminal apparatus to a usable condition, for example, by allowing connection to the external environment.

Since the data stored in the main memory 300 is retained by the auxiliary power supplied from the backup battery 400, basic settings and displays are maintained with the same data set before the power is lowered to the predetermined level. However, if the mobile terminal apparatus is left for a long time in the condition that the power is not supplied from the main battery, the backup battery runs out of power and does not supply any more auxiliary power to the main memory 300. As a result, the data stored in the main memory 300 is deleted, and becomes unrecoverable even if the power is re-supplied, for example, from the main battery.

In the state that the data of the main memory 300 is deleted, when the power is re-supplied, the mobile terminal apparatus is initialized by boot data stored in the flash memory 500. At this time, since a default image is displayed by default image data that is stored as the boot data, and a menu of the mobile terminal apparatus is set by default menu data, there is a problem that the mobile terminal apparatus cannot be booted with the lost user-set data, so that, for example, the user is required to re-set a display image and an operation menu of the default boot data in the mobile terminal apparatus.

SUMMARY OF THE INVENTION

Accordingly, the present invention provides an apparatus and a method of controlling an information process system of a mobile terminal apparatus using a flash memory that is capable of retaining user-set data when power of the mobile terminal apparatus is turned off, and operating the mobile terminal apparatus according to the user-set data.

Additional aspects and advantages of the invention will be set forth in part in the description which follows and, in part, will be obvious from the description, or may be learned by practice of the invention.

The present invention can be achieved by an apparatus controlling an information process system of a mobile terminal apparatus using a flash memory, the apparatus comprising a main memory storing data set by a user during operation of the mobile terminal apparatus, and a running program; a flash memory storing a backup data made with respect to the user-set data stored in the main memory when a main power of the mobile terminal apparatus is turned off and when a backup command is input by a user; and a programmed CPU determining whether the main power of the mobile terminal apparatus is turned off and whether the backup command is input by the user, and backing-up the user-set data stored in the main memory to the flash memory.

According to the apparatus controlling the information process system of the mobile terminal apparatus as described above, the user-set data can be safely retained even if the power-off condition continues for a long time.

According to an aspect of the present invention, the flash memory includes a boot data storing block and a user-set data storing block storing the backup data made with respect to the user-set data of the main memory.

According to another aspect of the present invention, a method of controlling an information process system of a mobile terminal apparatus having a flash memory storing boot data and a main memory, comprises determining whether a backup command with respect to data stored in the main memory is input; determining whether a power of a main battery of the mobile terminal apparatus is turned off during the operation of the mobile terminal apparatus; and backing-up the data stored in the main memory to the flash memory when determined that the backup command is input or when determined that the power of the main battery is turned off.

According to an aspect of the present invention, the backup data in the flash memory includes data set by a user. According to another aspect of the present invention, the method further comprises determining whether a user mode is set when the power is re-supplied to the mobile terminal apparatus; downloading the user-set image data from among the backup data in the flash memory to the main memory when determined that the user mode is set, and displaying a user-set image; and downloading a default image data from among the boot data stored in the flash memory to the main memory when determined that the user mode is not set, and displaying a default image.

BRIEF DESCRIPTION OF THE DRAWINGS

The above and/or other advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
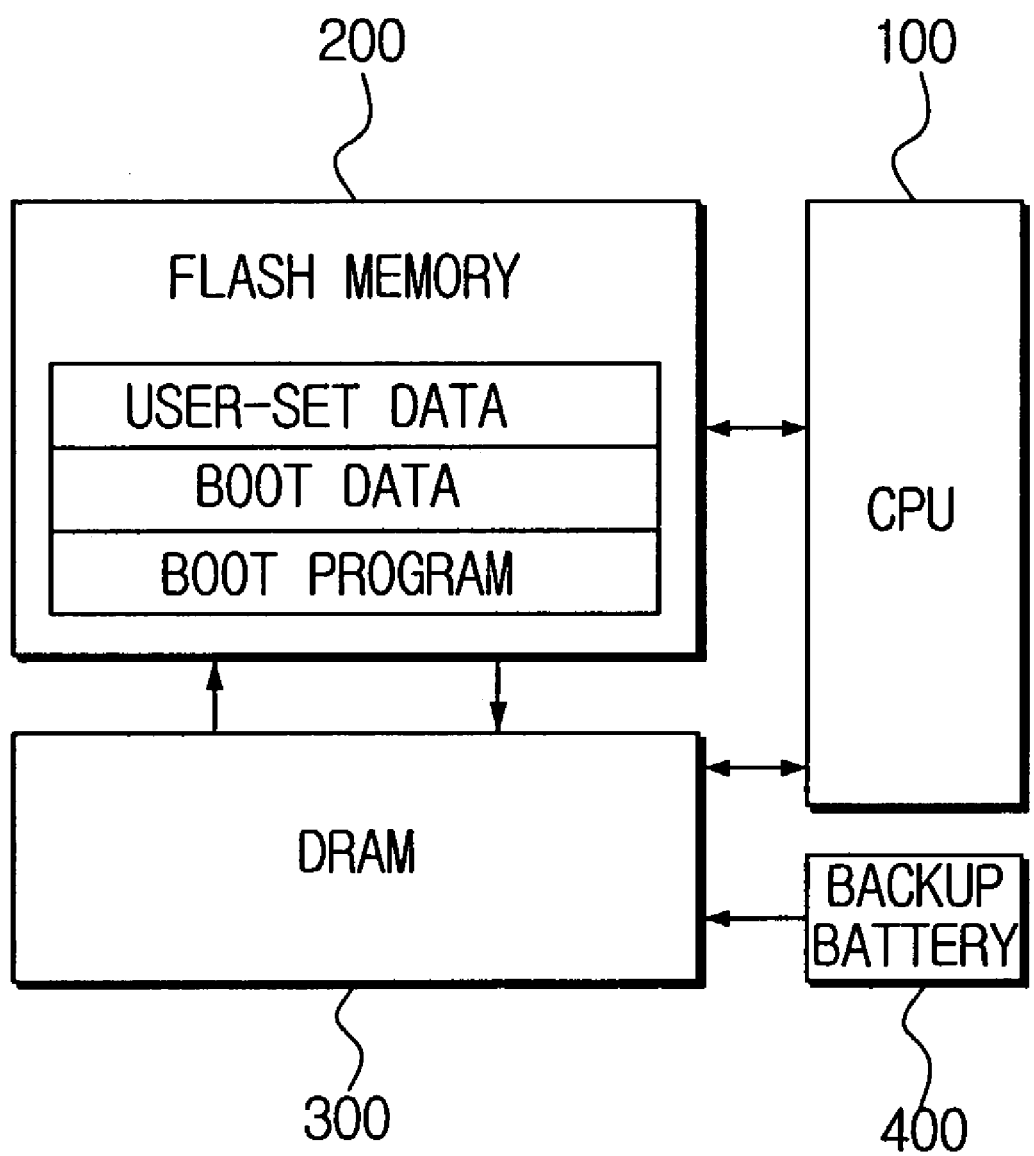
FIG. 1 is a block diagram of an information process system controlling a mobile terminal apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
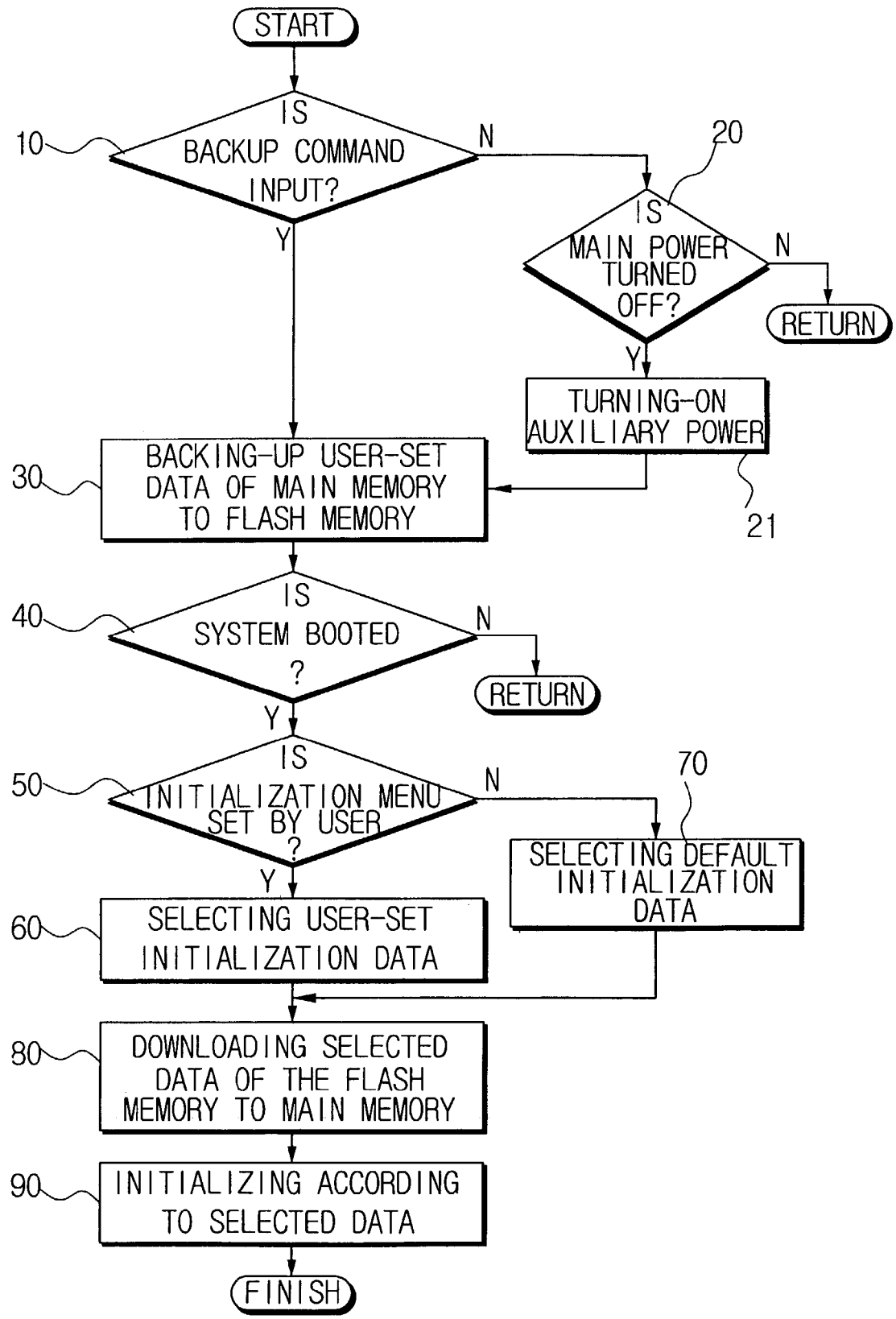
FIG. 2 is a flow chart of controlling the information process system of the mobile terminal apparatus shown in FIG. 1, according to an embodiment of the present invention.
Figure 3:
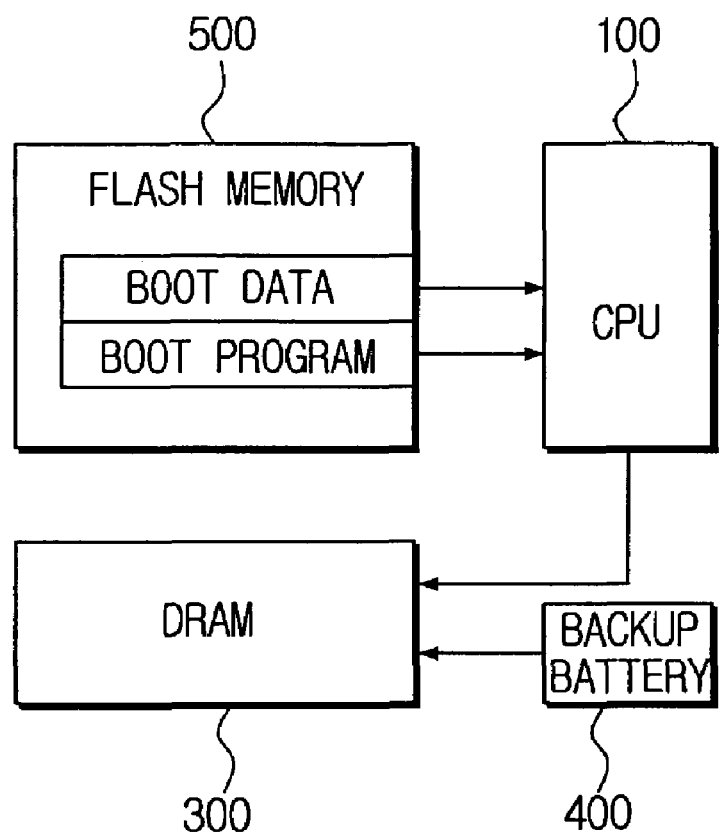
FIG. 3 is a block diagram of an information process system controlling a mobile terminal apparatus.

FIG. 1 is a block diagram of an information process system controlling a mobile terminal apparatus according to an embodiment of the present invention, and FIG. 2 is a flow chart of controlling the information process system of the mobile terminal apparatus shown in FIG. 1. As shown in FIG. 1, the information process system of a mobile terminal apparatus comprises a flash memory 200, a main memory 300, a CPU 100 and a backup battery 400. According to an aspect of the present invention, the information process system further comprises a main battery and a display portion (not shown).

The flash memory 200 comprises a non-volatile memory storing various data therein. Also, the flash memory 200 holds boot data used for booting the information process system of the mobile terminal apparatus, and data used by an application program, such as user-set data, etc. That is, the flash memory 200 retains the boot data, the boot program, application program data, etc., after such data have been copied to another volatile memory, such as the main memory 300. The flash memory 200 comprises a flash ROM or an electrically erasable and programmable ROM (EEPROM).

In particular, the flash memory 200 has a data storing area comprising a boot program block, a boot data block, and a user-set/application program/ transmission data block. The boot data is stored in the boot data block. The boot data comprises a default initialization menu data and a default initialization image data. Typically, the user-set data block stores user-set data that is backed-up from the main memory 300. For example, typically, the user-set data comprises a user-set initialization menu data and a user-set image data. The user-set data block can also store other application program data or transmission data.

A programmed CPU 100 controls the information process system of the mobile terminal apparatus. Especially, the CPU 100 functions to read the boot program and data, which are executed on a booting, from the flash memory 200 and to execute the read boot program according to the boot data (a boot sequence). The CPU 100 also functions to transmit the boot data from the flash memory 200 to the main memory 300 and to control data, such as application program data, user-set data, etc., (e.g., by executing/processing and storing the data) during the operation of the information process system of the mobile terminal apparatus.

Also, when the CPU 100 determines that main power of the mobile terminal apparatus is turned off (e.g., main battery power is depleted/removed or at a predetermined low level) during the operation of the mobile terminal apparatus, and/or that a backup command with respect to the user-set data is input by a user, the CPU 100 transmits data from the main memory 300 to the flash memory 200, such that the data stored in the main memory 300 is backed-up to the flash memory 200.

The main memory 300 comprises a DRAM storing the read boot data and other user-set data, application program data and transmission data. In particular, the main memory stores a program, data, and user-set data that are running with a main power supply. Accordingly, the data stored in the main memory are deleted when the main power is turned off. However, according to the present invention, the data stored in the main memory 300 can be saved/backed up in the flash memory 200, upon detecting interruption in power from the main power supply to the information process system and/or in response to a user input back-up command.

FIG. 2 is a flow chart of controlling the information process system of the mobile terminal apparatus shown in FIG. 1, according to an embodiment of the present invention. Typically, a program that is running during the operation of the mobile terminal apparatus and data set by a user are stored in the main memory 300. At operation 10, during the operation of the mobile terminal apparatus, if a user inputs a backup command with respect to the user-set data stored in the main memory 300, at operation 30, the CPU 100 backs-up the user-set data stored in the main memory 300 to the flash memory 200. Otherwise, during the operation of the mobile terminal apparatus, if, at operation 20, the CPU 100 determines that power of the main battery is deemed turned off, at operation 21, the CPU 100 allows power from the backup battery 400 (auxiliary power) to be supplied to the main memory 300. The power of the backup battery 400 is supplied to the main memory 300 such that the data stored in the main memory is not deleted. After operation 21, at operation 30, the CPU 100 transmits user-set data to back-up the user-set data stored in the main memory 300 to the flash memory 200. Accordingly, the user-set data is backed up upon detecting that power of the main battery is deemed turned off and/or upon a user input back-up command.

When the power is re-supplied to the mobile terminal apparatus which is deemed turned off as described above, and the system is re-operated, at operation 40 a boot program runs according to the boot sequence. Then, at operation 50, the CPU 100 determines whether an operation mode of the mobile terminal apparatus is a user-set mode. When the operation mode of the mobile terminal apparatus is the user-set mode, at operation 60, the user-set data is selected from among the backup data in the flash memory 200 and, at operation 80, the selected user-set data is downloaded to the main memory 300. Typically, the user-set data includes the initialization menu data and the initialization image data. At operation 90, according to the downloaded user-set data, the information process system of the mobile terminal apparatus is initialized.

At operation 50, when the operation mode of the mobile terminal apparatus is not the user-set mode, at operation 70 the default boot data stored in the flash memory 200 is selected and at operation 80 the selected default data is downloaded to the main memory 300. At operation 90, according to the downloaded default boot data, the information process system of the mobile terminal apparatus is initialized.

Meanwhile, since the downloaded data in the main memory 300 can have user-set image data, the user-set initialization image is displayed if the mobile terminal apparatus is booted in the user-set mode. If the operation mode is not the user-set mode, the default image data from among the boot data stored in the flash memory 200 is downloaded to the main memory 300 and the default initialization image is displayed. According to the present invention, when the power of the main battery is deemed turned off during the operation of the mobile terminal apparatus or when a main battery power-off condition continues for a long time (e.g., beyond power supply of the backup battery 400), main memory 300 data, such as the user-set image data, can be prevented from being deleted. More particularly, a programmed CPU controls the information process system of a mobile unit by determining whether the main power is turned off and/or whether the backup command is input by the user, and backs up main-memory data to the flash memory. Accordingly, when the mobile unit is re-operated, the mobile unit can be initialized, for example, with any back up user-set data or other backup data. For example, if the user-set data is backed-up to the flash memory, and, thus, is retained when the main power is deemed turned off, an initialization image and an initialization menu can be executed according to the user-set data when the mobile terminal apparatus is re-operated. The processes of the present invention can be implemented in software and/or computing hardware.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling an information process system of a mobile terminal apparatus having a flash memory in which boot data is stored and a main memory to store data, the method comprising:
   determining whether a backup command with respect to initialization data, which is set by a user during operation of the mobile terminal apparatus and stored in the main memory, is input;
   determining whether power from a main battery of the mobile terminal apparatus is turned off during operation of the mobile terminal apparatus;
   backing-up the user-set initialization data stored in the main memory to the flash memory in response to the backup command and/or the main battery power turned off;
   determining whether an operation mode of the mobile terminal apparatus is a user-set modes, when the mobile terminal apparatus is re-operated by main battery power;
   downloading user-set initialization data from among the backup data in the flash memory to the main memory when the operation mode is the user-set mode, and initializing the information process system of the mobile terminal apparatus according to the user-set initialization data; and
   downloading default boot data stored in the flash memory to the main memory when the operation mode is not the user-set mode, and initializing the information process system of the mobile terminal apparatus according to the default boot data.

2. A method of controlling an information process system of a mobile terminal apparatus having a flash memory in which boot data is stored and a main memory to store data, the method comprising:
   determining whether a backup command with respect to initialization data comprising user-set initialization image data and user-set initialization menu data, which is set by a user during operation of the mobile terminal apparatus and stored in the main memory, is input;
   determining whether power from a main battery of the mobile terminal apparatus is turned off during operation of the mobile terminal apparatus;
   backing-up the user-set initialization data stored in the main memory to the flash memory in response to the backup command and/or the main battery power turned off;

determining whether a user mode is set when the main battery power is re-supplied to the mobile terminal apparatus;

downloading the user-set initialization data comprising the user-set initialization image and menu data from among the backup data in the flash memory to the main memory when the user mode is set, and displaying the user-set initialization data comprising the user-set initialization image and menu data; and downloading default image data from among the boot data stored in the flash memory to the main memory when the user mode is not set, and displaying the default image.

\* \* \* \* \*

UNITED STATES PATENT AND TRADEMARK OFFICE
CERTIFICATE OF CORRECTION

| | |
|---|---|
| PATENT NO. | : 7,062,600 B2 |
| APPLICATION NO. | : 10/385463 |
| DATED | : June 13, 2006 |
| INVENTOR(S) | : Young-jae Yoo |

Page 1 of 1

It is certified that error appears in the above-identified patent and that said Letters Patent is hereby corrected as shown below:

Column 6, Line 38, change "modes," to --mode,--.

Signed and Sealed this

Twenty-eighth Day of November, 2006

JON W. DUDAS
*Director of the United States Patent and Trademark Office*